(12) United States Patent
Rice et al.

(10) Patent No.: US 6,772,497 B2
(45) Date of Patent: Aug. 10, 2004

(54) METHOD AND APPARATUS FOR RECYCLING OIL FILTERS

(76) Inventors: Edwin E. Rice, 2100 W. Delhi Rd., Ann Arbor, MI (US) 48103; Charles H. Franklin, 1902 Longshore Dr., Ann Arbor, MI (US) 48105

( * ) Notice: Subject to any disclaimer, the term of this patent is extended or adjusted under 35 U.S.C. 154(b) by 195 days.

(21) Appl. No.: 10/006,587

(22) Filed: Dec. 5, 2001

(65) Prior Publication Data

US 2003/0101564 A1 Jun. 5, 2003

(51) Int. Cl.⁷ .................................................. B23P 19/02
(52) U.S. Cl. ....................... 29/426.4; 29/402.03; 29/700
(58) Field of Search ............................ 29/426.4, 402.03, 29/403.1, 403.3, 700; 100/902, 216, 45

(56) References Cited

U.S. PATENT DOCUMENTS

| | | | |
|---|---|---|---|
| 5,214,830 A | | 6/1993 | Rozycki |
| 5,274,906 A | * | 1/1994 | ter Haar ........................ 29/700 |
| 5,279,215 A | | 1/1994 | Harder |
| 5,299,352 A | | 4/1994 | Klenk |
| 5,327,822 A | * | 7/1994 | Koenig ......................... 100/45 |
| 5,331,888 A | | 7/1994 | Brown, Jr. |
| 5,383,397 A | | 1/1995 | Battles et al. |
| 5,406,691 A | | 4/1995 | Thorne |
| 5,447,573 A | | 9/1995 | Christensen |
| 5,488,899 A | * | 2/1996 | Jennings et al. .............. 100/49 |
| 5,678,478 A | | 10/1997 | Goyal et al. |
| 5,735,197 A | | 4/1998 | Kleine |
| 5,857,407 A | | 1/1999 | Gross et al. |

* cited by examiner

Primary Examiner—I Cuda Rosenbaum
Assistant Examiner—Stephen Kenny
(74) Attorney, Agent, or Firm—Ian C. McLeod

(57) ABSTRACT

The invention provides a method for automatically processing multiple used oil filters (3, 34) used for internal combustion engines for disposal, in particular for disposal in which essentially all of the residual oil is removed making the crushed canister (18, 18A) and internal element a non-hazardous material and making the connector base plate (38A) available for recycling as scrap steel.

28 Claims, 16 Drawing Sheets

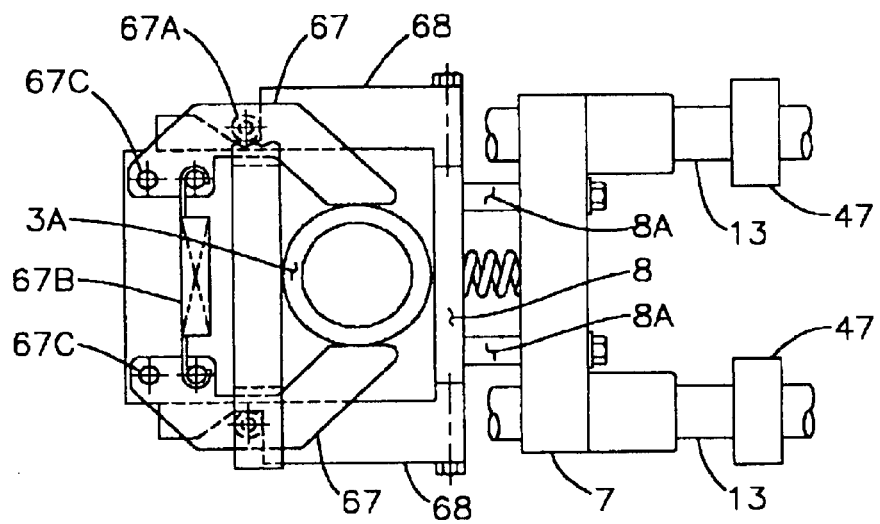
FIG. 13A
FIG. 13B
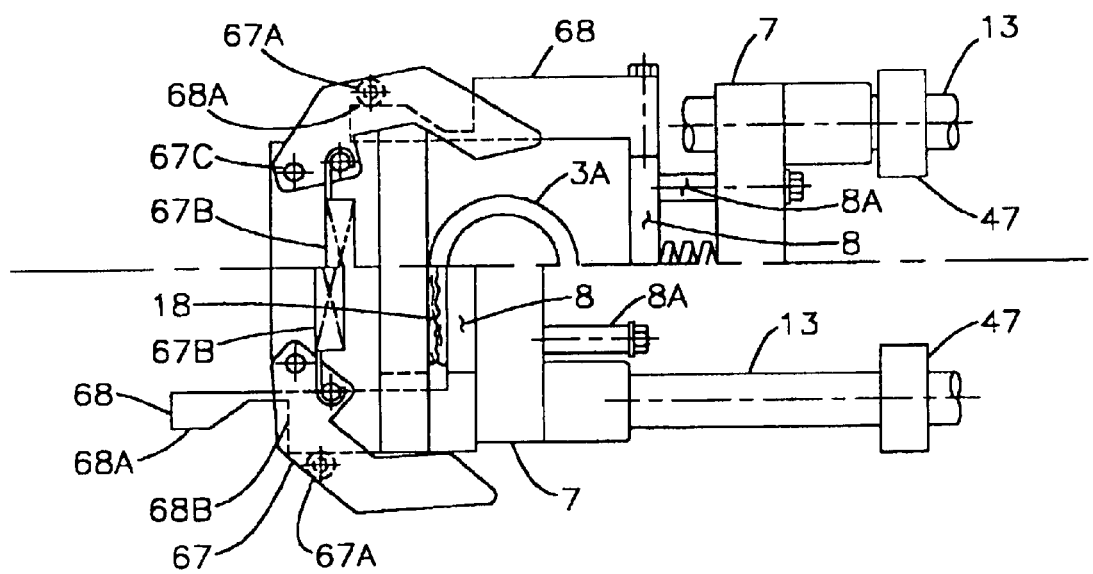
FIG. 13C

METHOD AND APPARATUS FOR RECYCLING OIL FILTERS

CROSS-REFERENCE TO RELATED APPLICATION

Not applicable.

STATEMENT REGARDING FEDERALLY SPONSORED RESEARCH OR DEVELOPMENT

Not applicable.

Reference to a "Computer Listing Appendix Submitted on a Compact Disc"

Not Applicable.

BACKGROUND OF THE INVENTION (1) Field of the Invention

The invention relates to a method for automatically processing multiple used oil filters used for internal combustion engines for disposal, in particular for disposal in which essentially all of the residual oil is removed making the crushed canister and internal element a non-hazardous material and making the connector base plate available for recycling as scrap steel.

(2) Description of Related Art

Many state governments have classified used automotive and truck oil filters with substantial amounts of retained oil as a hazardous waste material causing a high disposal cost. A number of states have statutes that provide for special hazardous waste sites for landfill of these materials with substantial charges for their use. There is also a potential generator liability where filters have been disposed of without removing essentially all the retained oil.

Methods have been devised for removing residual oil from used filters and for removing the base plate. However, the more common method in general use for removing the oil involves crushing the filter axially with the base plate intact. Most filters are constructed with a check valve in conjunction with the base plate preventing free flow of oil out of the filter assembly during axial crushing thus leaving a substantial amount of oil. The methods devised for removing the base plate lack the simplicity and/or ruggedness needed for an economical automatic system.

The ideal location for processing used oil filters is at the service facility that removes the filter from the vehicle, in particular if the filter can be processed while it is still warm. Service facilities normally deal with more than one size of filter. This multiple size processing requirement coupled with the numerous small business locations require an economical rugged system with adaptive size processing capability.

Automatic operation is needed for uniformity of processing and for labor savings. Automatic operation also facilitates the processing of warm filters as they are removed from the vehicle, as minimal operator input is required to initiate the process.

U.S. Pat. No. 5,274,906 provides for shearing off the base plate and then crushing the canister and filter element normal to the filter axis. The mechanism as claimed in '906 is not suitable for adapting to automatic operation, particularly where it is desired for the processed filter components to have a minimum amount of residual oil or where it is desired to separate the base plate from the canister and filter element. '906 deposits the sheared connector plate and crushed canister assembly into a common receptacle where oil from subsequent cycles will drain onto previously processed filter components. It has been found that when severing filter connector plates, small pieces of the internal construction of filters are generated and it is believed that shearing plate 43 in '906 will generate shaving like pieces which will collect and fill shear plate receiving slot 58 requiring on going maintenance and thus limit the utility of apparatus described.

SUMMARY OF THE INVENTION

The invention provides a method for automatically processing multiple used oil filters used for internal combustion engines for disposal, in particular for disposal in which essentially all of the residual oil is removed making the crushed canister and internal element a non-hazardous material and making the connector base plate available for recycling as scrap steel.

Therefore, the present invention provides a method and apparatus for processing used oil filters for recycling where the connector plates are severed from the canister and where the canister and filter elements are crusher squeezing out waste oil. A processing or crushing zone with one stationary wall and one opposite and parallel movable wall is provided on guide-ways and with both walls having one edge in a common plane.

Thus, the present invention provides an apparatus for processing multiple used oil filters for an engine using oil for lubrication by shearing a connector plate of each filter from a canister and then crushing the canister which comprises (a) a fixed wall in a frame against which a used oil filter is positioned in a crushing zone with the connector plate below the canister; (b) a movable wall mounted on the frame which is movable by a driving means to engage the filter in the crushing zone to crush the filter, and which is retracted by the driving means from the crushing zone; (c) blade means mounted adjacent to the movable wall or adjacent to the fixed wall so as to shear the connector plate from the canister as the movable wall crushes the canister against the fixed wall; (d) a floor mounted on the frame for the removal of the used oil the sheared connector plate and the crushed canister from the apparatus; and (e) a feed chute with an escapement means for individually and automatically feeding the oil filters to the crushing zone based upon the position of the movable wall wherein the retaining means holds a preceding oil filter of the multiple filters away from the crushing zone until the used oil, the crushed canister and the sheared connection plate have been removed from the crushing zone of the apparatus.

The present invention further provides a process for automatically processing used oil filters of the type used in an engine which comprises (a) individually crushing the filters fed by a multiple filter feed means of an apparatus with an escapement for metering one filter at a time into a crushing zone; (b) removing a filter connector base plate from a canister of the filter in the crushing zone by a guillotine like shearing action; (c) compressing the canister of the filter with an internal filter element to a crushing pressure thereby extracting residual oil from the canister and filter element; and (d) discharging the connector plate and crushed canister filter element from the apparatus.

Further still, the present invention provides an apparatus for automatically processing used oil filters of the type used in an engine comprising (a) a multiple filter feed means with an escapement for metering one filter at a time into a zone with a blade means, which removes a connector plate from a canister of the filter by a guillotine like shearing action, compression means for compressing the canister and filter element at a crushing pressure thereby extracting residual oil from the filter element, door means for selectively discharging the crushed canister, filter element and the connector plate from the apparatus.

Further still, the present invention provides an apparatus for processing multiple used oil filters for an engine using oil for lubrication by shearing a connector plate of each filter from a canister and then crushing the canister which comprises (a) a fixed wall in a frame against which a used oil filter is positioned in a crushing zone with the filter axis parallel to the fixed wall; (b) a movable wall mounted on guideways of the frame which is movable by a driving means to engage the filter in the crushing zone to crush the filter, and which is retracted by the driving means from the crushing zone; (c) blade means mounted on the driving means adjacent to the movable wall and adjacent to the fixed wall so as to shear the connector plate from the canister as the movable wall crushes the canister against the fixed wall; (d) a retractable floor in said crushing zone mounted on the frame which retracts for the removal of the used oil, the sheared connector plate and the crushed canister from the apparatus; and (e) a feed chute with an escapement means for individually and automatically feeding the oil filters to the crushing zone based upon the position of the movable wall, wherein the retaining means holds a preceding oil filter of the multiple filters away from the crushing zone until the used oil, the crushed canister and the sheared connector plate have been removed from the crushing zone.

Further still, the present invention provides in an apparatus for processing oil filters for an engine using oil for lubrication by shearing a connector plate from a canister with a blade means which shears the connector plate and wherein the canister is crushed between a movable wall driven by a driving means and a fixed wall, the improvement which comprises an oil pump actuated by the driving means to remove the oil from a container for delivery to a storage tank, the improvement which comprises the blade means fixed to the driving means and a spring-loaded collapsible wall which engages the canister while the blade means cuts the connector plate and then the movable wall crushes the canister.

Significant features of the present invention are: (1) a retractable floor is preferably provided under the crushing zone having a horizontal surface in a first position, a retracted sloping surface in a second position and third position that is away from under the crushing zone and with said positions being in sequence with movements and positions of said movable wall. The retractable floor in the second position preferably forms a sloping surface to direct sheared off filter connector plates to a first selected location and the retractable floor in the third position is away from under said processing zone allowing processed filter canister assemblies to fall to an inclined surface directing them to a second select location.

(2) An escapement is provided for escaping one filter at a time into said processing zone. A Filter loading chute for feeding filters to be processed to said escapement.

(3) A driving mechanism is provided for driving the movable wall towards and away from said stationary wall, preferably having a spring-loaded attachment to the movable wall and having the spring-loaded attachment collapsing to solid upon the moving wall meeting predetermined resistance as the driving mechanism advances towards the stationary wall.

(4) A shearing blade is preferably attached to the driving mechanism and positioned so the shearing plane is normal and adjacent to the walls common edge and with a shearing edge leading relative to advance motion of the driving mechanism, positioned so that the shearing edge is masked by the spring-loaded movable wall when the movable wall is not meeting resistance but is extended as driving mechanism advances and movable wall meets resistance and because of the filter where upon the movable wall spring-loading collapses, shearing edge extends into and through the processing zone creating a shearing action as said blade passes said common edge of the stationary wall. A discharge means is provided for discharging processed filter components.

(5) A waste oil sump is provided for the recovered oil.

(6) The process is preferably controlled by a master control system and the process cycle is automatic.

(7) The filter axis in the processing zone is preferably vertical with the base plate down.

(8) Preferably, a pump to pump collected waste oil to a remote location is provided on the apparatus where the pump is preferably a piston type and action is slaved off said driving mechanism motion.

(9) Preferably the discharge means have paths for receiving severed base plates from a first select location and crushed filter canisters from a second select location cradles with draining provisions for holding them until a significant point in the subsequent process cycle before discharging them through diverting channels directing sheared off filter base plates to one external collection point and processed filter canisters to a second external collection point.

(10) The movable wall and the stationary wall are preferably essentially parallel to each other but one or both having a shallow concave shape in the surface running parallel to and centered with the axis of a filter in the processing zone.

(11) The driving mechanism preferably uses a hydraulic cylinder for the driving force and the shearing blade has a shearing edge which is a recessed vee shape.

(12) Preferably, the feed chute is positioned on the centerline of the crushing zone.

(13) The used filters are preferably escaped one at a time and reoriented from the feed chute slope into a vertical position on a shutter like mechanism over the crushing zone.

(14) Preferably, a shutter mechanism is operated by the action of the movable wall driving means and timed to feed the used filter into the crushing zone after the preceding crushed canister and connector plate are removed from the zone.

OBJECTS

It is the object of this invention to provide a process and apparatus for automatically processing used oil filters where the filters are placed in a feed chute having capacity for several filters and from which filters are escaped one at a time and fed into a crushing zone where the filter is supported by a an openable floor, where the filter is first clamped by an advancing of a movable wall driven by a hydraulic cylinder means positioning and holding the filter against a parallel fixed wall and where the driving means contains a shearing blade positioned to shear off a filter connector plate as the driving means with a spring-loaded attachment to the movable wall continues to advance collapsing the spring-loaded attachment exposing the blade to the filter. The shearing action continues and when the spring loading has fully collapsed, and the movable wall is solidly driven by the driving means crushing the filter canister to a crushing pressure against the stationary wall extracting the oil from the filter element and canister and where the used oil is collected in a container mounted to the apparatus.

An another objective of the invention is directing the severed connector plate in one direction away from oil draining and directing the crushed filter canister in another direction to facilitate segregation of the connector plate as scrap steel.

Another objective of the invention is an openable floor in the crushing zone to first open forming an incline plane to direct the discharged severed connector plates in one direction and on further opening having means for crushed canisters to go in another direction.

A further objective of the invention is to hold the squeeze force on the filter canister assembly for a finite period of time to facilitate more complete draining.

Still another objective of the invention is a discharge action at the start of a subsequent cycle that discharges the previously crushed filter canister and connector plate from the apparatus to separate positions for select disposal/recycle of each with the discharge action completed in a sufficiently short time so as not to drain oil from the dumping apparatus into receiving containers.

It is yet another objective of the invention to provide a pumping means for pumping the used oil from the apparatus collection container to a remote used oil storage.

These and other objects of the present invention will become increasingly apparent with reference to the following drawings and preferred embodiments.

DESCRIPTION OF THE DRAWINGS

FIG. 13A shows a means for centering filters in the crushing zone but prior to crushing and shearing of the connector plate comprising; fingers moving in equal distance from each side coming against a filter centering it.

FIG. 13B illustrates filter centering, fingers retracted so as not to interfere with escaping a filter into the crushing zone.

FIG. 13C illustrates filter centering fingers fully retracted so as not to interfere with the movable wall in the advance position.

DETAILED DESCRIPTION OF THE INVENTION

All patents, patent applications, government publications, government regulations, and literature references cited in this specification are hereby incorporated herein by reference in their entirety. In case of conflict, the present description, including definitions, will control.

Figure 1:
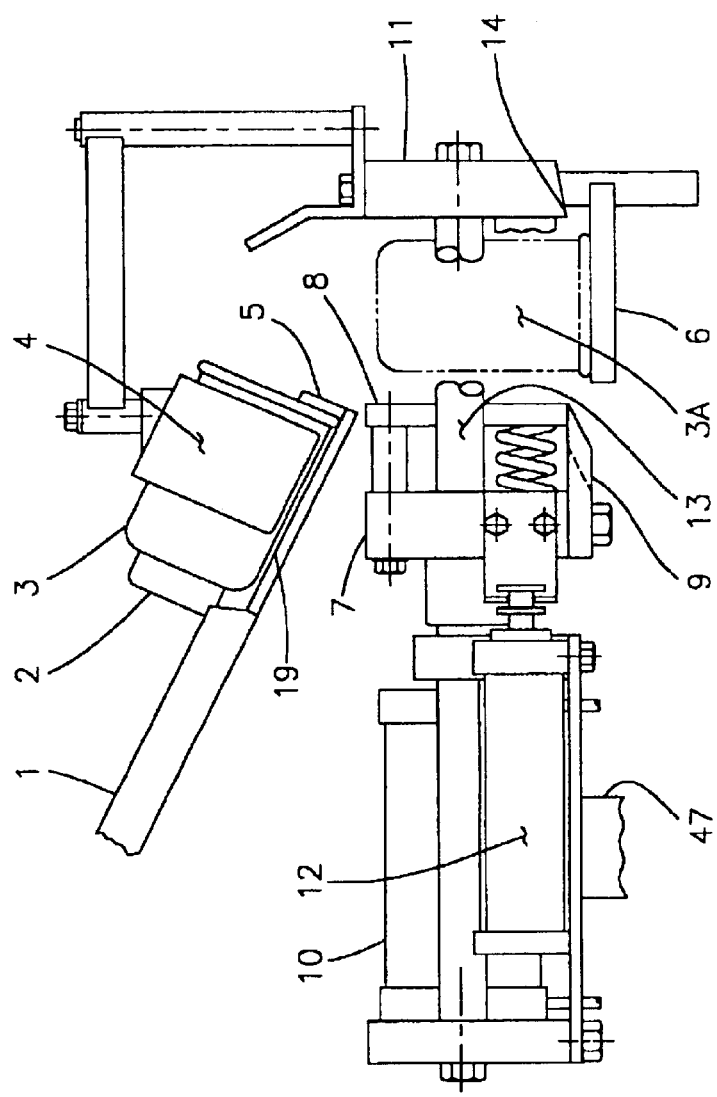
FIG. 1 is a side view of the main apparatus components of this invention showing the primary structure and moving mechanisms, including a filter feed chute, filter escapement for feeding one filter at a time into a crushing zone, a movable wall driven by a hydraulic cylinder driving means, a fixed wall, an openable floor for supporting filter in the crushing zone, a piston type pump for pumping collected used oil, an enlarged view of the shearing blade with recessed vee shearing edges and a partial view of the apparatus supporting structure.
Figure 1A:
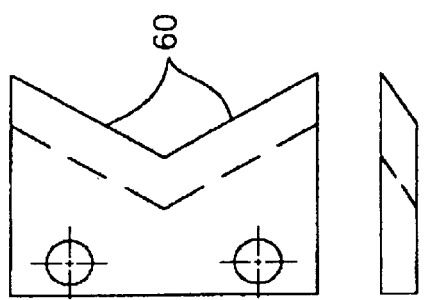

Reference is made to FIG. 1 illustrating hydraulic cylinder 10 mounted to a frame comprising guideways 13 and fixed wall 11 with the frame attached to floor support 47 through brackets 27. Hydraulic cylinder 10 powers driving means 7 mounted on guideways 13 and movable wall 8 is mounted to the driving means through a spring-loaded coupling.

In FIG. 1, driving means 7 mounted on guideways 13 is returned and driving means spring-loaded attachment to movable wall 8 is fully extended. In FIG. 1 but more easily seen in FIG. 3, escapement shuttle 4 is adjacent to and in alignment with a crushing zone, formed by a fixed wall 11, the opposite facing spring-loaded wall 8 and central to the two guideways 13. Retractable openable floor 6 forms the bottom of the crushing zone and supports filter 3 in position 3A in the crushing zone with the filter axis parallel to the fixed wall.

Figure 2:
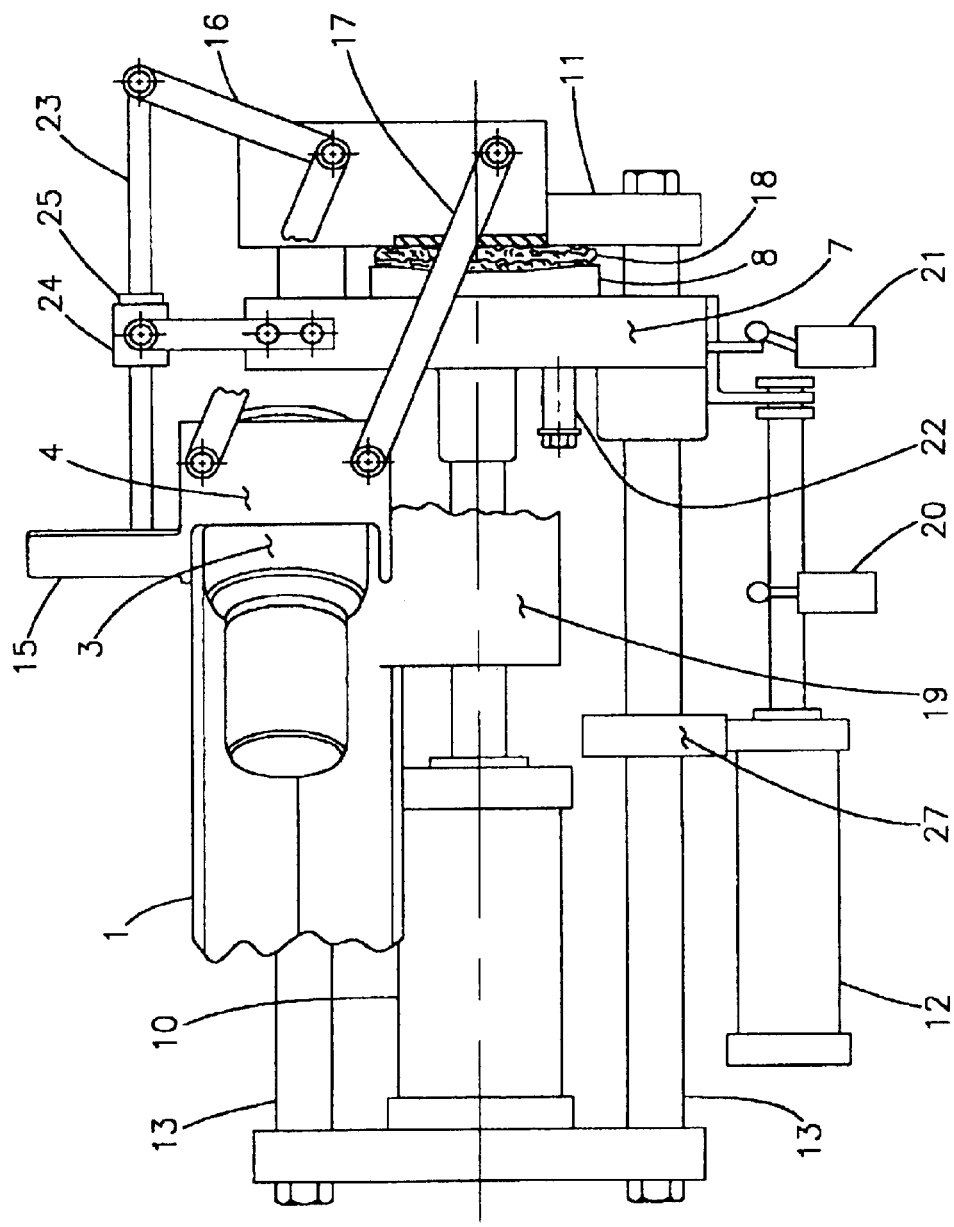
FIG. 2 is a top view including the hydraulic cylinder driving means in the advanced position, spring-loaded movable wall with a concave surface in contact with a crushed filter canister, the escapement shuttle in position to receive a filter from the feed chute, the escapement shuttle actuating mechanism, the used oil pump cylinder and hydraulic cylinder driving means position indicating switches.

The operating cycle starts with escaping a filter into the crushing zone which begins, as seen in FIG. 2, with movable wall 8 driven to its advanced position by the driving means 7, during the previous cycle, with bearing 24 having traveled along slide bar 23 contacting collar 25 fixed to bar 23 driving bar 23 attached to lever 16. Lever 16 and parallel levers 17 are rotated to where shuttle cradle 4 carried by parallel levers 17 is adjacent with feed chute 1 and where filter 3 moved by gravity has enter escapement shuttle 4. Filter 3 was previously restricted from sliding down feed chute 1 by shield 15 attached to shuttle 4 when shuttle 4 was out of position to receive filter 3. After a driving means 7 advanced dwell period, during which time, additional used oil can drain from crushed filter canister 18, hydraulic cylinder 10 retracts driving means 7.

Figure 5:
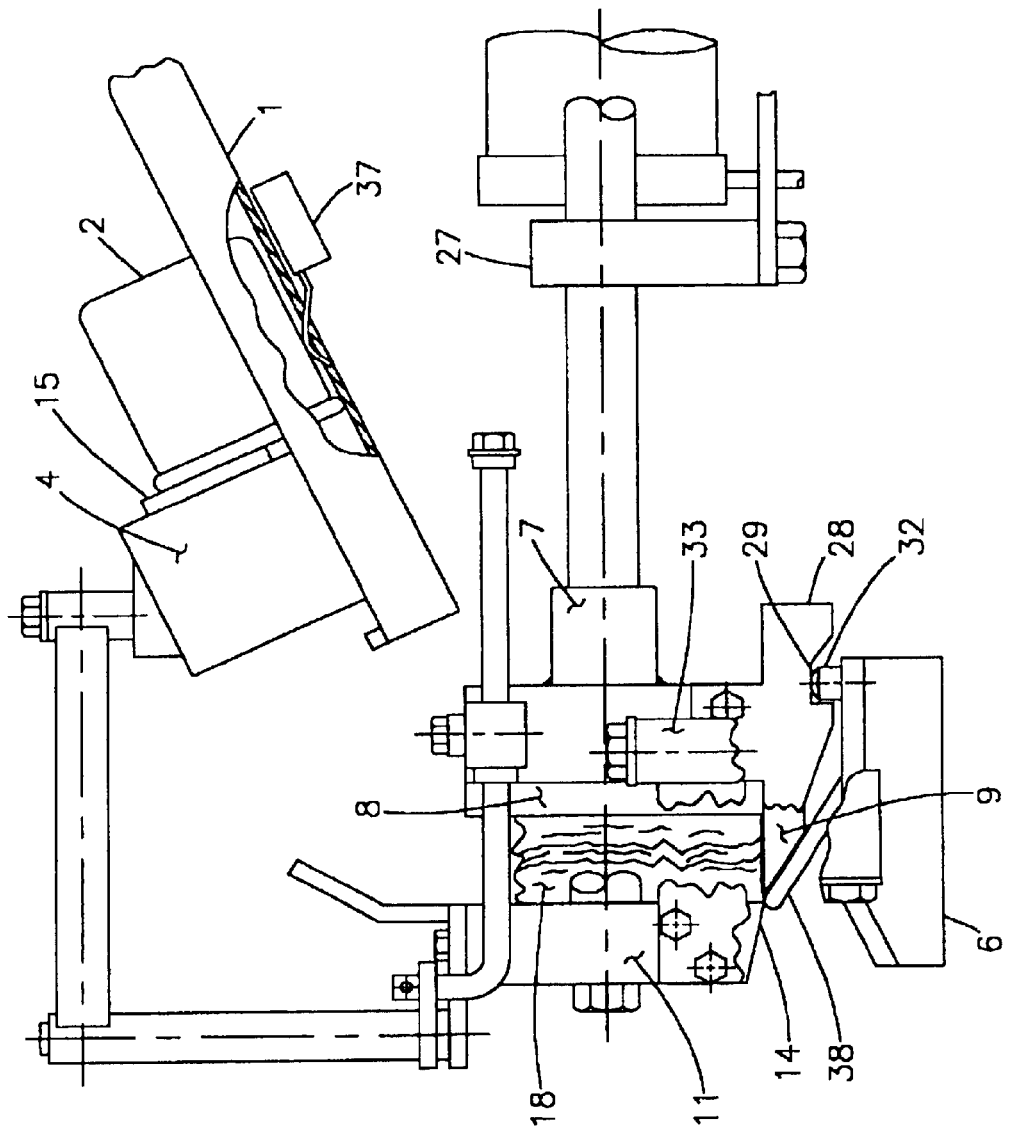
FIG. 5 is similar to FIG. 4 but showing the hydraulic cylinder driving means nearing the full advance position and showing the filter connector plate nearly sheared off with the retractable floor positioned so as not to interfere with the shearing of the filter connector plate.
Figure 7:
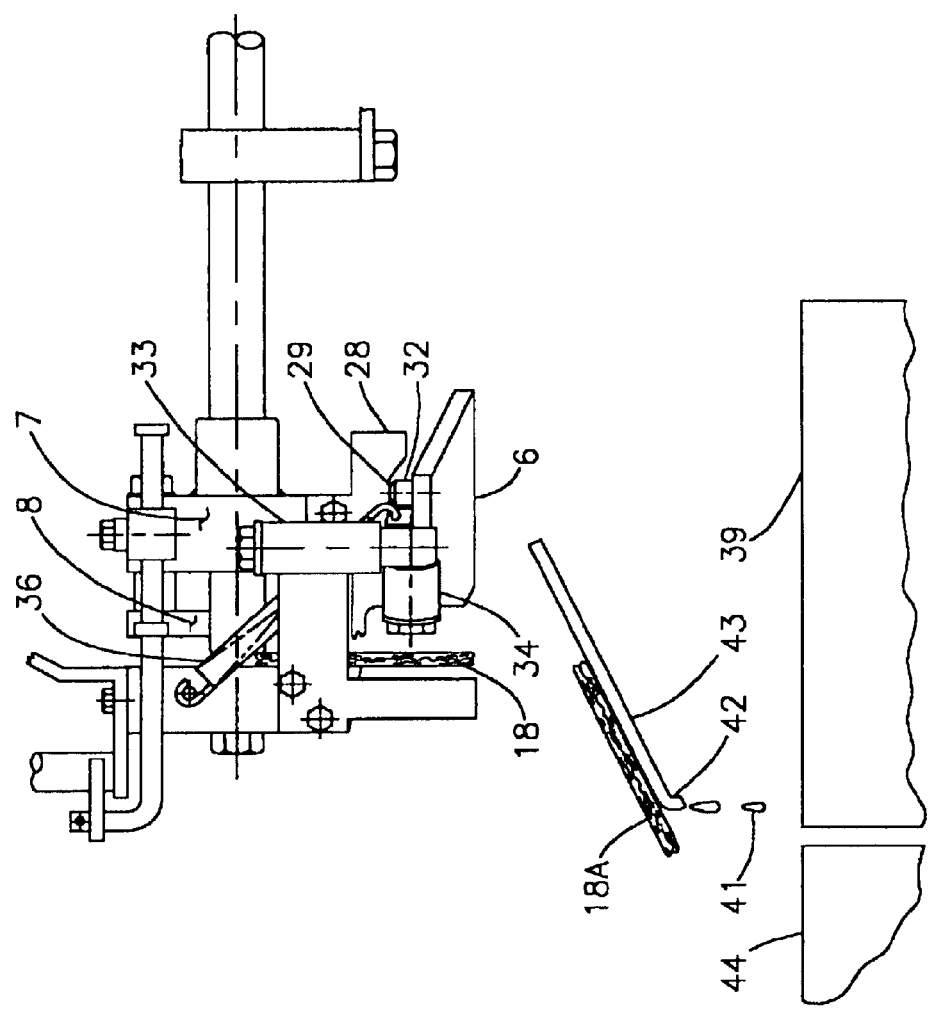
FIG. 7 is a view similar to FIG. 5 except the driving means is partially returned, the filter support floor is opened swung on a vertical axis providing clearance for a crushed filter canister to drop free onto a fixed sloping surface directing it in another direction.

In FIG. 5 it can be seen that as driving means 7 retracts, cam 28 attached to driving means 7, with notch 29, engages pin 32 on floor 6. As driving means 7 continues to retract, cam notch 29 bears on retractable floor pin 32 causing openable floor 6 to rotate about vertical pivot mounting 33 as can be seen in FIG. 7. This rotating action of openable floor 6 swings it on an arc creating an opening under the crushing zone and crushed filter canister 18. During this same increment of driving means 7 retracting, spring-loaded movable wall 8 extends stripping crushed filter canister 18 off shear blade 9.

Further retraction of driving means 7 and with spring-loaded movable wall 8 fully extended, crushed canister 18 is released falling by gravity onto sloping surface 43. Draining used oil 41 follows the curved lip 42 of surface 43 directing the flow of used oil 41 downwards into collection container 39 while inertia of moving crushed canister 18A carries it in one direction to location 44 where it enters a discharge means (not shown) leading to an external location.

Figure 3:
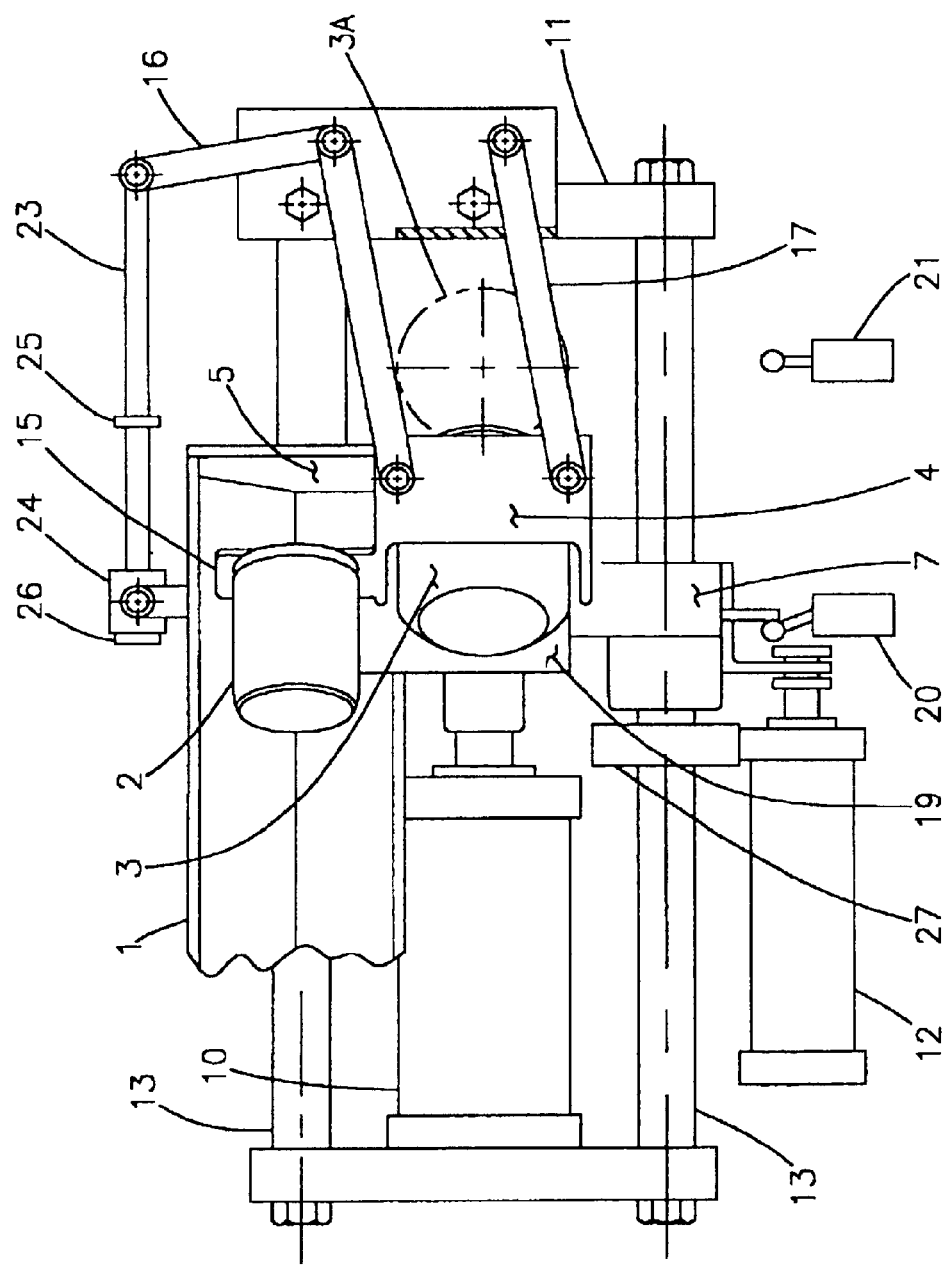
FIG. 3 is similar to FIG. 2 except it shows the hydraulic cylinder driving means retracted and the escapement shuttle in position to escape a filter into the crushing zone.

During the final increment of retraction of driving means 7, as seen in FIG. 3, sliding bearing 24 driven by ram 7 contacts collar 26 on slide bar 23 pulling bar 23 which in turn causes levers 16 and 17 to rotate counter-clockwise. Levers 17 move escapement shuttle 4 with filter 3 from a position adjacent to feed chute 1 to a position adjacent to the crushing zone. Filter 3 carried along by shuttle 4 is supported by sloping platform 19 during the later part of the transverse movement. Filter 3 is restricted from sliding axially along sloping surface 19 and out of shuttle 4 by feed chute end stop plate 5, which is at the end of and normal to feed chute 1, until essentially the completion of the shuttle transverse movement. End plate 5 extends towards the crushing zone (center of the machine) but ends so as to allow filter 3 in shuttle 4, when adjacent to the crushing zone, to slide off sloping surface 19 into the crushing zone as depicted by filter 3B. Filters in feed chute 1 are kept from advancing in feed chute 1 when shuttle 4 is not in alignment with feed chute 1 by shield plate 15 attached to shuttle 4.

With filter 3 escaped into position 3A in the crushing zone, driving means 7 advances driven by hydraulic cylinder 10 bringing movable wall 8 into firm contact with filter in position 3A. Driving means 7 also advances shearing blade 9, with a recessed vee shaped cutting edge as illustrated in FIG. 1, into engagement with filter in position 3A at essentially the top surface of filter 3A connector plate.

Figure 4:
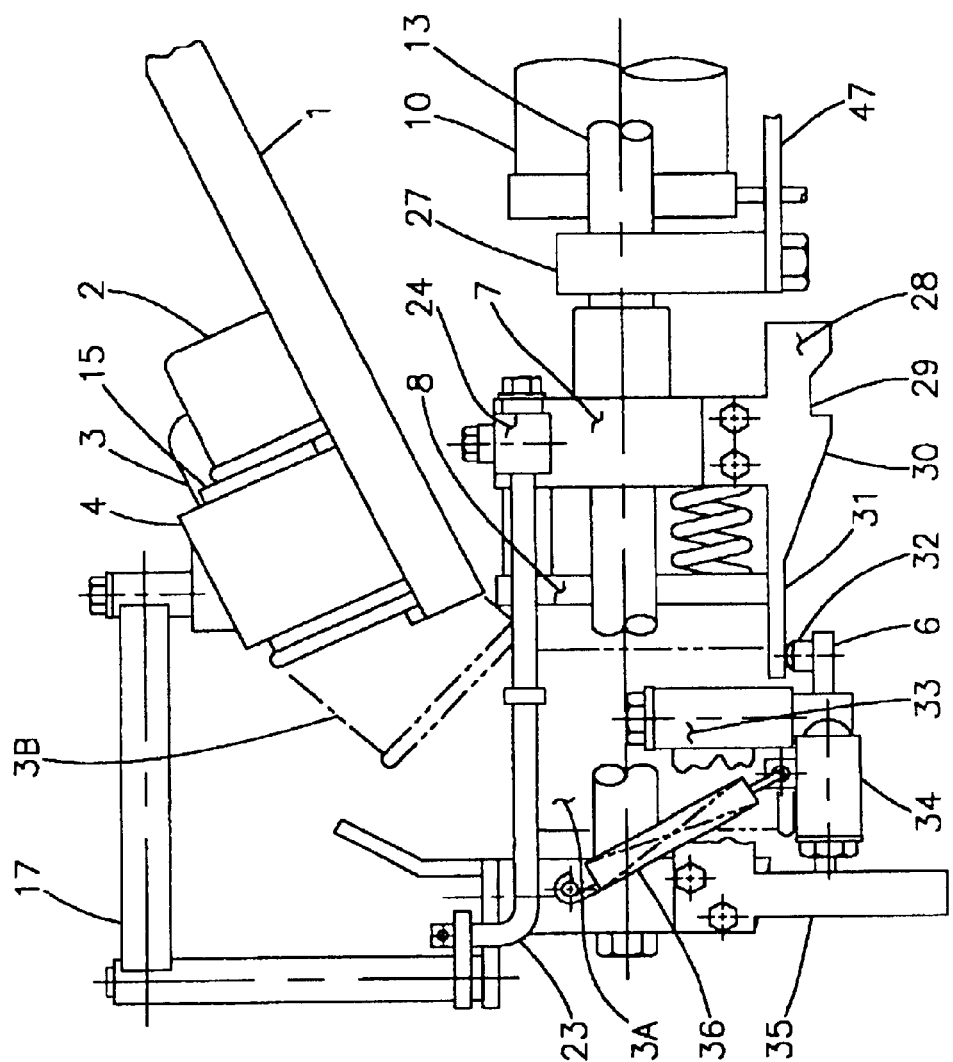
FIG. 4 is an side view of the side opposite FIG. 1 showing detail of the pivoting supporting mechanism for the retractable (openable) floor for supporting a filter in the crushing zone and showing the path of a filter being escaped into the crushing zone.
Figure 6:
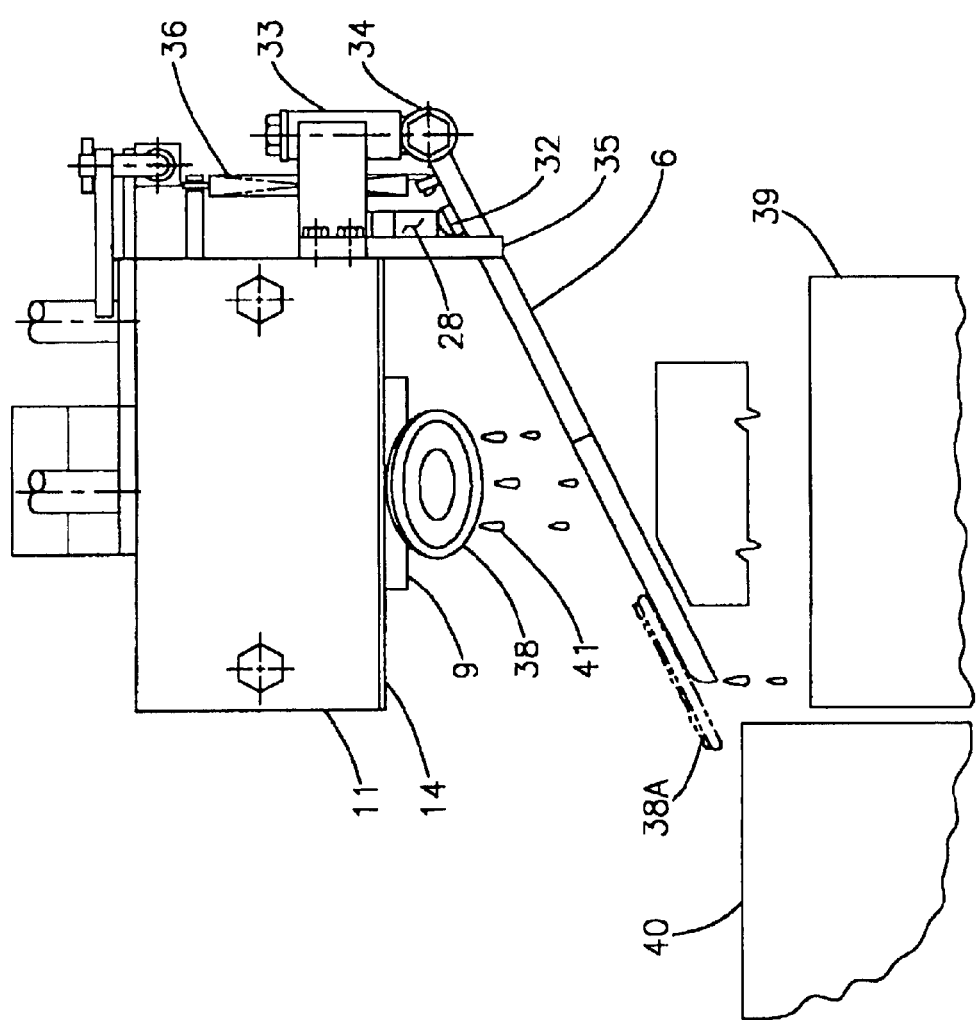
FIG. 6 is a left end projection view of FIG. 5 showing the filter support floor in the retracted downward sloping first position, used oil draining from the crushed canister and the final shearing of the connector plate and it being directed in one direction.

As shearing blade 9 engages filter 3A, spring-loaded movable wall 8 securely holds filter 3A against fixed wall 11. Further advancement of driving means 7 causes the collapse of spring-loaded attachment to movable wall 8, crushing canister 18 and severing connector plate 38 by shearing action between blade 9 and fixed wall edge 14. During this period of driving means 7 advance, cam bar 28, attached to driving means 7, as seen in FIG. 4 and FIG. 5, ramp 30 has engaged pin 32 attached to filter support floor 6. Spring 36 holds pin 32 on floor 6 in contact with cam 28. Pin 32 is camed downwards, by ramp 30, causing floor 6, as seen in FIG. 5 and FIG. 6, to rotate about horizontal pivot mounting 34 to a downward sloping angle as seen in FIG. 6.

The sloping attitude of floor 6 has two functions; first is to provide clearance for severing of filter connector plate 38 which is forced downwards as it is sheared by blade 9; the second function is to form an incline plane for severed connector plate 38A to slide on in another direction to location 40. The end of floor 6 has a curved edge, as seen in FIG. 6, which directs draining used oil 41 downwards. Inertia carries severed connector plate 38A to location 40 where it enters a discharge means (not shown) leading to an external location.

Driving means 7 completes its advance motion crushing filter canister 18 squeezing used oil from canister 18. It has been found when crushing filter canisters normal to their axis to extract used oil, flat wall surfaces apply more pressure to the central axis portion of the canister than to areas farthest from the filter axis. A shallow concave surface in one or both of the wall surfaces, in contact with the canister while crushing, more evenly distributes the pressure on the canister for more complete used oil extraction. This concave wall surface is illustrated in FIG. 2.

As driving means 7 completes its advance stroke, bearing 24 moved by driving means 7 motion contacts collar 25 fixed on slide bar 23 connected to lever 16 causing clockwise rotation of lever 16 and parallel levers 17 positioning shuttle 4 adjacent to feed chute 1 moving shield 15 away from contact with filters manually placed in feed chute 1. Filters, in feed chute 1, are now free to slide one filter increment down feed chute 1 placing the lead filter in shuttle 4. The foregoing description of operation covers one complete cycle which will repeat automatically providing at the appropriate point of the automatic cycle, a filter to be processed is sensed in feed chute 1 by the logic controller in FIG. 9 through filter sensing switch 37 in FIG. 5.

Figure 9:
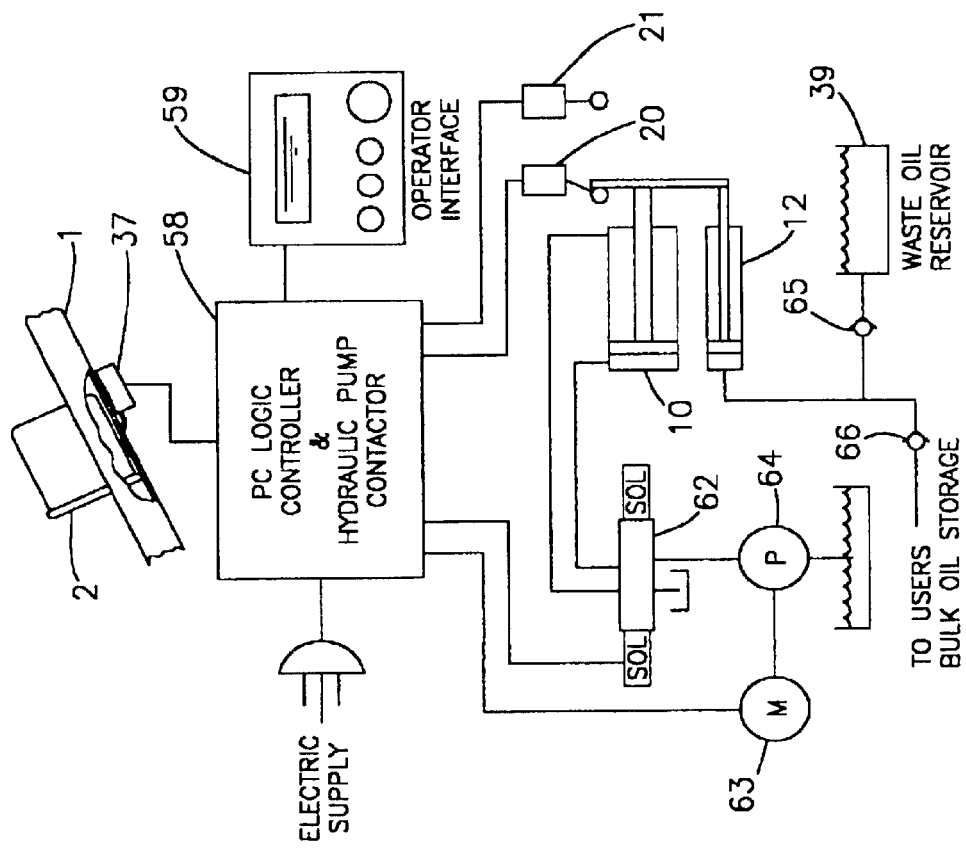
FIG. 9 is a schematic of the control functions which provide for automatic operation of the process.

FIG. 9 schematic illustrates the relationship between the various control components and the operation of the used oil pump. The process automatic cycle is monitored and controlled by a programmable logic controller depicted in schematic block 58. Electrical power is fed by a power cord to an electrical magnetic contactor, also depicted in block 58, which is energized by manual input through operator interface 59. The contactor in turn energizes the logic controller and the hydraulic pump drive motor 63. Hydraulic pump 64 supplies hydraulic pressure to the solenoid operated 4-way directional valve 62. The logic controller receives input signals at significant positions in the process cycle from drive means hydraulic cylinder 10 position indicating switches 20 and 21. When an automatic cycle is initiated through the operator interface, the logic controller in the appropriate sequence energizes one of directional valves 62 solenoids directing hydraulic pressure to the blind end of drive means hydraulic cylinder 10 causing it to advance releasing "cylinder returned" sensing switch 20. As drive means 7 completes its forward stroke, the "cylinder advanced" sensing switch 21 is actuated. After a squeeze dwell period, the logic controller energizes the opposite solenoid on the directional valve 62 which in turn ports hydraulic pressure to the rod end of the drive means cylinder 10 causing it to retract. When hydraulic cylinder 10 drive means advances, it also extends the used oil pump cylinder 12 piston rod connected through a mechanical coupling. The used oil pump cylinder 12 draws oil from the used oil container 39 through check valve 65. As cylinder 10 returns, retracting pump cylinder 12 piston rod, used oil is pumped out through second check valve 66 to a remote used oil storage tank.

Exception to the automatic cycle described above occurs if there is not a filter in feed chute 1 at the moment the logic controller monitors filter present switch 37. If a filter is not present, the automatic cycle is interrupted until a filter is placed in feed chute 1 and is sensed by switch 37.

Figure 8:
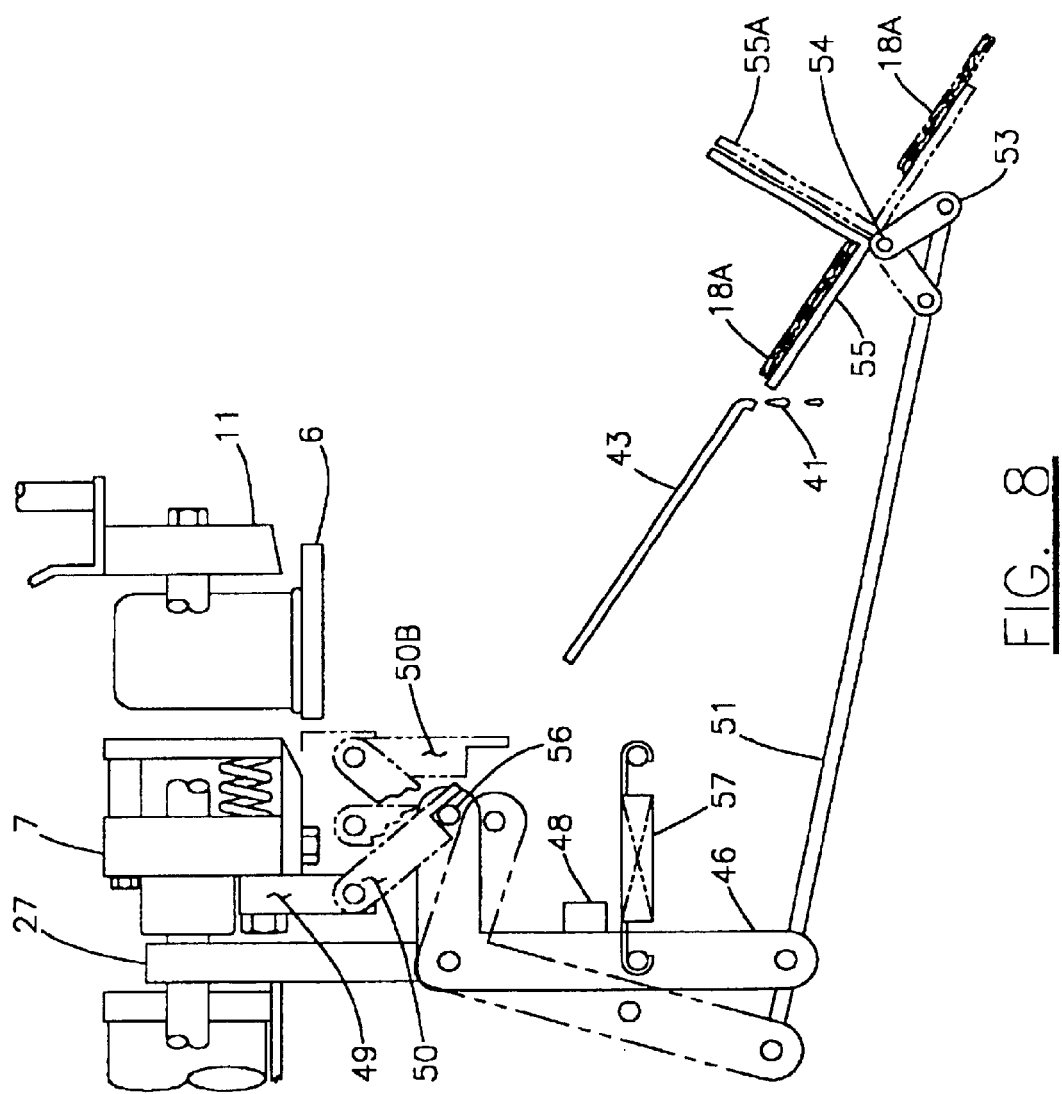
FIG. 8 shows a mechanism for receiving a crushed filter canister from the sloping surface shown in FIG. 7 and retaining it until the start of a subsequent cycle where it is discharged by the initial advance movement of the driving means via linkage.

An option, to the above process and apparatus, is illustrated in FIG. 8 for receiving crushed filter canister 18A from location 44 and holding crushed canister 18A before it is discharged from the apparatus until the start of advance motion of driving means 7 in the subsequent cycle. This provides a holding time for residual used oil on crushed canister 18A to drain off. Discharge cradle 55 has provisions, not illustrated, for draining. As driving means 7 starts advancing, pawl 50, attached to driving means 7 through pawl 50 pivot point on bracket 49, engages pin 56 on bell crank 46 rotating bell crank clockwise. Bell crank 46 pulls on link 51 through a pivoting connection. Link 51 pulling on arm 53 attached to cradle 55 pivot shaft 54 rotates cradle 55 essentially 90 degrees, to attitude illustrated by the cradle 55 in position 55A, where crushed canister 18A is discharged by gravity. Immediately after cradle 55 reaches its full clockwise rotation position, it begins its return to its initial position as pawl 50 travels "over center" allowing tension spring 57 to return bell crank 46 back to stop 48. Cradle 55 discharge cycle is completed in the first portion of driving means 7 forward stroke. Pawl 50 hangs free (50B) during the remaining driving means 7 forward stroke. On driving means 7 return stroke, pawl 50 is reset as it rides up over pin 56. This optional function can be modified to also include severed filter connector plates received from location 40. Another feature of cradle 55 discharge cycle is the relative short time period the cradle is in the discharge position to where it could drip used oil in an unwanted place.

In practice, because of used oil viscosity, no oil drains off during the short period the cradle is in position 55A. The above optional discharge cradle 55 cycle can be arranged with two diverting channels so as to discharge a crushed filter canister in one position and a severed connector plate to another position.

Figure 11:
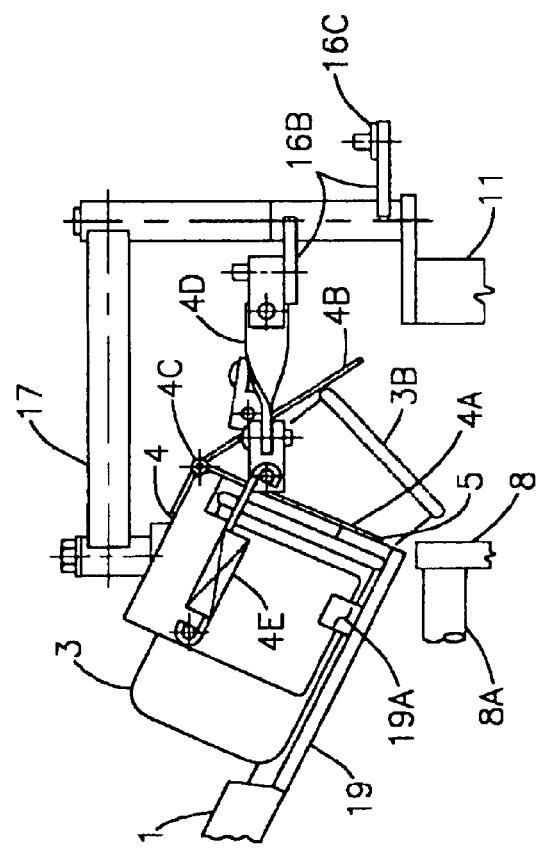
FIG. 11 illustrates an improvement to the escapement means with a door incorporated on the shuttle that opens when the escapement means is adjacent to the crushing zone.
Figure 12:
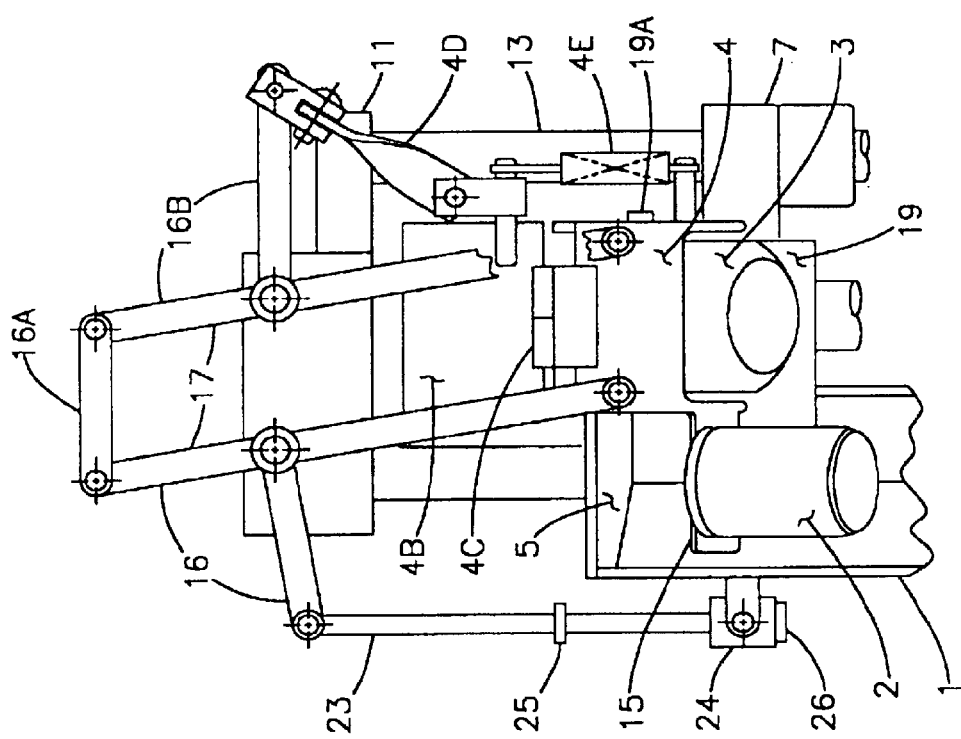
FIG. 12 is a top view illustrating the actuating means for escapement means improvement of FIG. 11.

Another option to the above process and apparatus is adding door 4A to shuttle 4, illustrated in FIG. 11, to assist in directing filter 3B into the crushing zone. With this added feature, linkage actuating the shuttle transverse motion is modified, as illustrated in FIG. 12, to open shuttle door 4A subsequent to shuttle 4 completing its traverse motion to a position adjacent to the crushing zone. Shuttle 4 traverse motion is interrupted by it coming in contact with stop 19A at which point driving means 7 still has a short distance to travel on its return stroke. As driving means 7 completes its return stroke, bar 23 pulls on bell crank 16 arm rotating bell crank 16 counter-clockwise. Bell crank 16 is on the same axis as one parallel lever 17 but is not rotationally connected. Bell crank 16 drives link 16A transferring motion to bell crank 16B which is on the same axis as another parallel lever 17 but has no angular drive connection to it. Traverse motion of shuttle 4, for this option, is driven through link 4D connecting bell crank 16B arm with shuttle door 4B attached by hinge 4C which is held closed by spring 4E. The increment of return motion of driving means 7, after shuttle 4 has come to rest against stop 19A, continues the transfer of motion to link 4D which pulls on door 4A, overcoming spring 4E opening Door 4D to position 4B. This is illustrated in FIG. 11.

Opening shuttle door to position 4B releases filter 3 and deflects filter 3B into an axis vertical attitude as it is driven by gravity into the crushing zone. On driving means 7 forward stroke, the above apparatus motions are reversed returning shuttle 4 to its position adjacent to feed chute 1.

Figure 10:
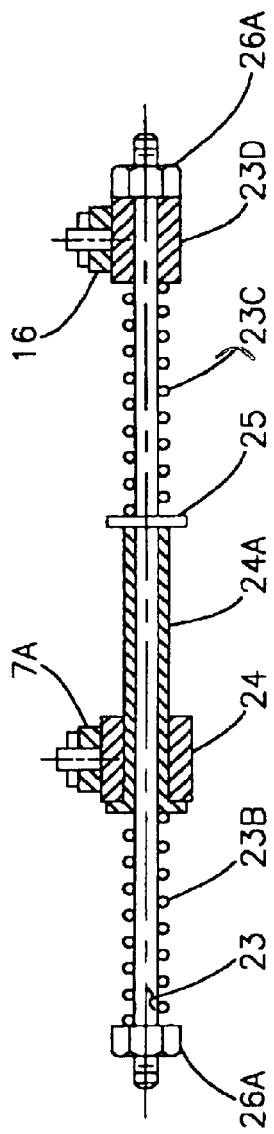
FIG. 10 illustrates a modification to the slide bar for actuating the escapement providing spring over travel if the escapement was not free to travel its full stroke because of a fault.

Still another option to the above apparatus is spring overtravel protection added to shuttle 4 transverse drive slide bar 23, illustrated in FIG. 10. The normal forward motion of driving means 7 is limited by the thickness of a crushed canister in the crushing zone as driving means 7 stalls against the crushed canister. In event there is not a filter in the crushing zone, driving means 7 overtravels driving the escapement linkage of FIG. 2 and FIG. 3 into an overtravel position which could cause damage. Also, if escapement motions were restricted by a misaligned filter or some other malfunction, linkage driving escapement motions could be damaged. To prevent such damage, escapement drive link slide bar 23 can be modified as illustrated in FIG. 10.

In normal operation, as driving means 7 advances, bearing 24 slides free on shouldered sleeve 24A until bearing 24 contacts collar 25 fixed to bar 23. Further motion of bearing 24 drives bar 23 actuating the escapement means but if shuttle 4 is restricted from moving a normal amount, for example, spring 23C will compress allowing bar 23 to continue to travel sliding through bushing 23D avoiding damage.

On driving means 7 return stroke, if there is a restriction to an escapement motion, bearing 24 can continue to travel causing shouldered sleeve 24A to slide on bar 23 compressing spring 23B and preventing damage. springs 23B and 23C are preloaded providing normally required driving forces without there deflection.

A further option to the above process and apparatus is a means for centering filters in the crushing zone is illustrated in FIGS. 13A, 13B and 13C. A filter resting on floor 6 (refer to FIG. 1) in the crushing zone, is centered as driving means begins its forward stroke advancing movable wall 8. During the first increment of movable wall 8 advance stroke but before a filter in position 3A is griped by movable wall 8, centering fingers 67, under tension of spring 67B, are released by ramps on cam bars 68, as illustrated in FIG. 13A, to move towards each other, rotating around pivot pins 67C, as rollers 67A mounted on the lower side of center fingers 67 ride down the ramps on cam bar 68, centering filter 3A. As movable wall 8 continues to advances, centering finger rollers 67A are engaged by perpendicular cam bar ramps 68B which swing fingers 67 outwards to clear advancing movable wall 8. This is illustrated in FIG. 13C. When a filter to be processed is escaped into the crushing zone, centering fingers 67 are held retracted, so not to interfere with feeding of filters, by surface 68A of cam bars 68. This illustrated in FIG. 13B.

Figure 14A:
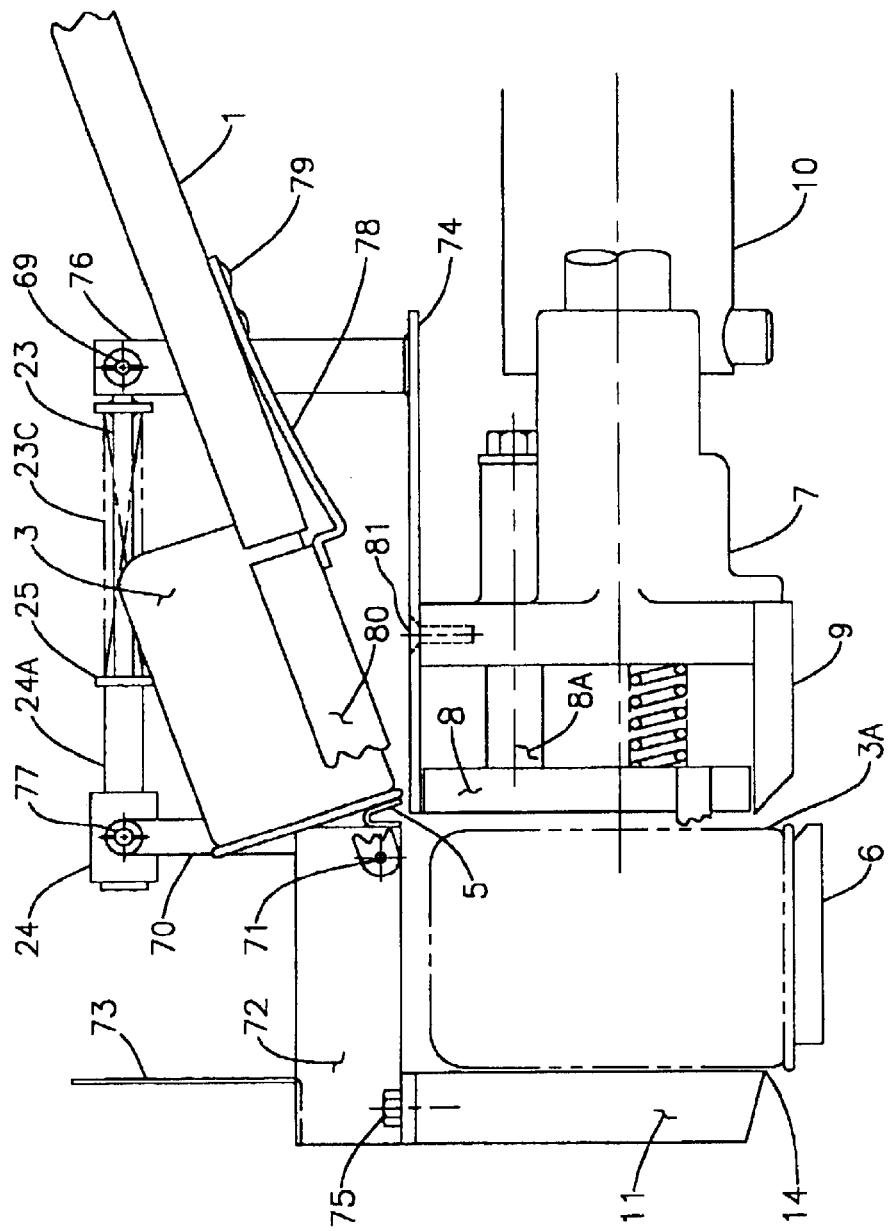
FIG. 14A illustrates an alternate filter escapement means comprising; a feed chute aligned centrally with the crushing zone and a cradle at the lower end of the feed chute adjacent to the crushing zone hinged so as to tip-up a filter on the cradle to an axis vertical position.
Figure 14B:
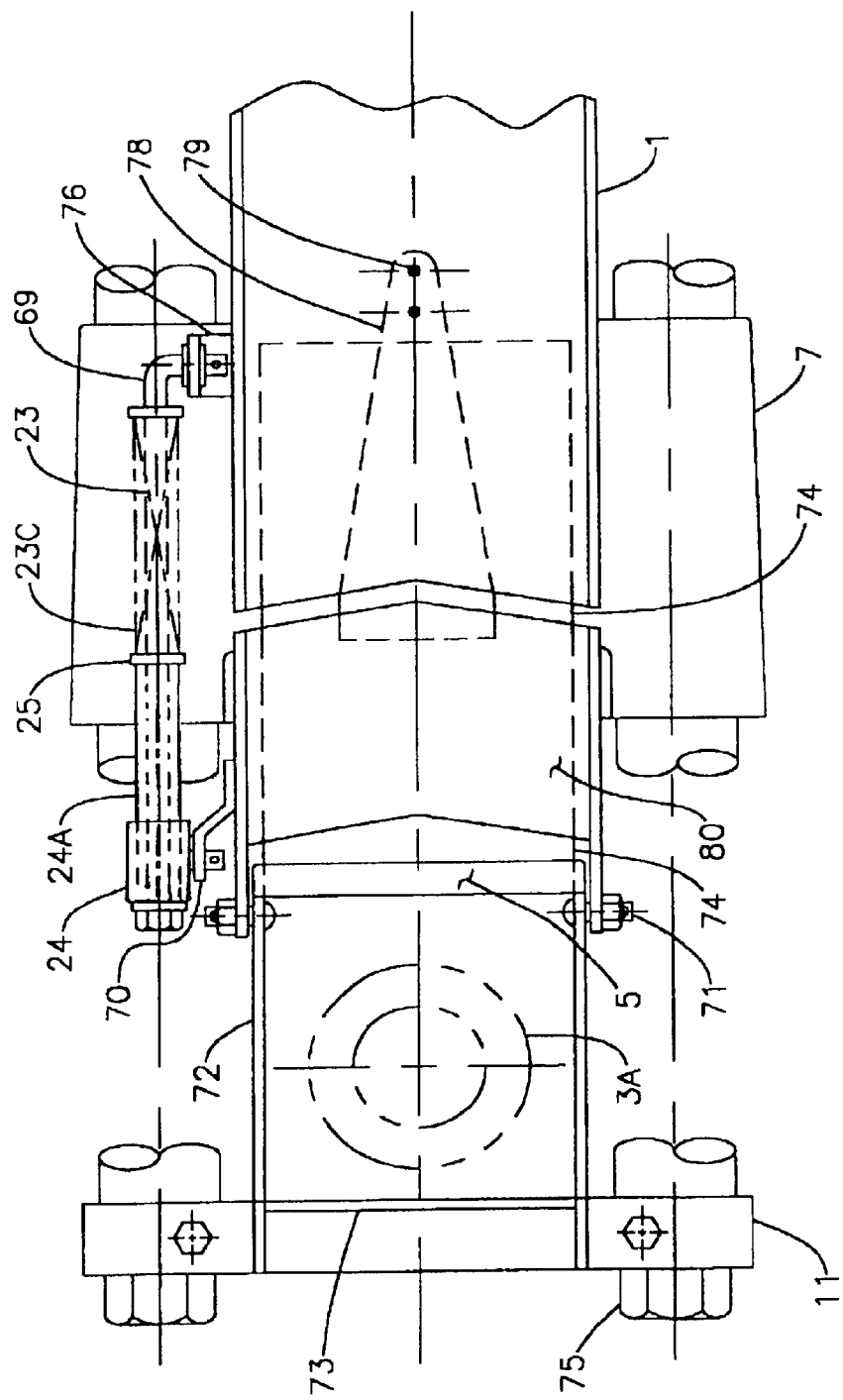
FIG. 14B the alternate escapement means illustrating the cradle in the vertical tipped-up position actuated by the advance motion of the driving means depositing the filter being fed on a horizontal plate above the crushing zone with the plate attached to the driving means so that the horizontal plate is pulled out from under the tipped-up filter, as the driving means retracts, releasing the filter into the crushing zone.
Figure 14C:
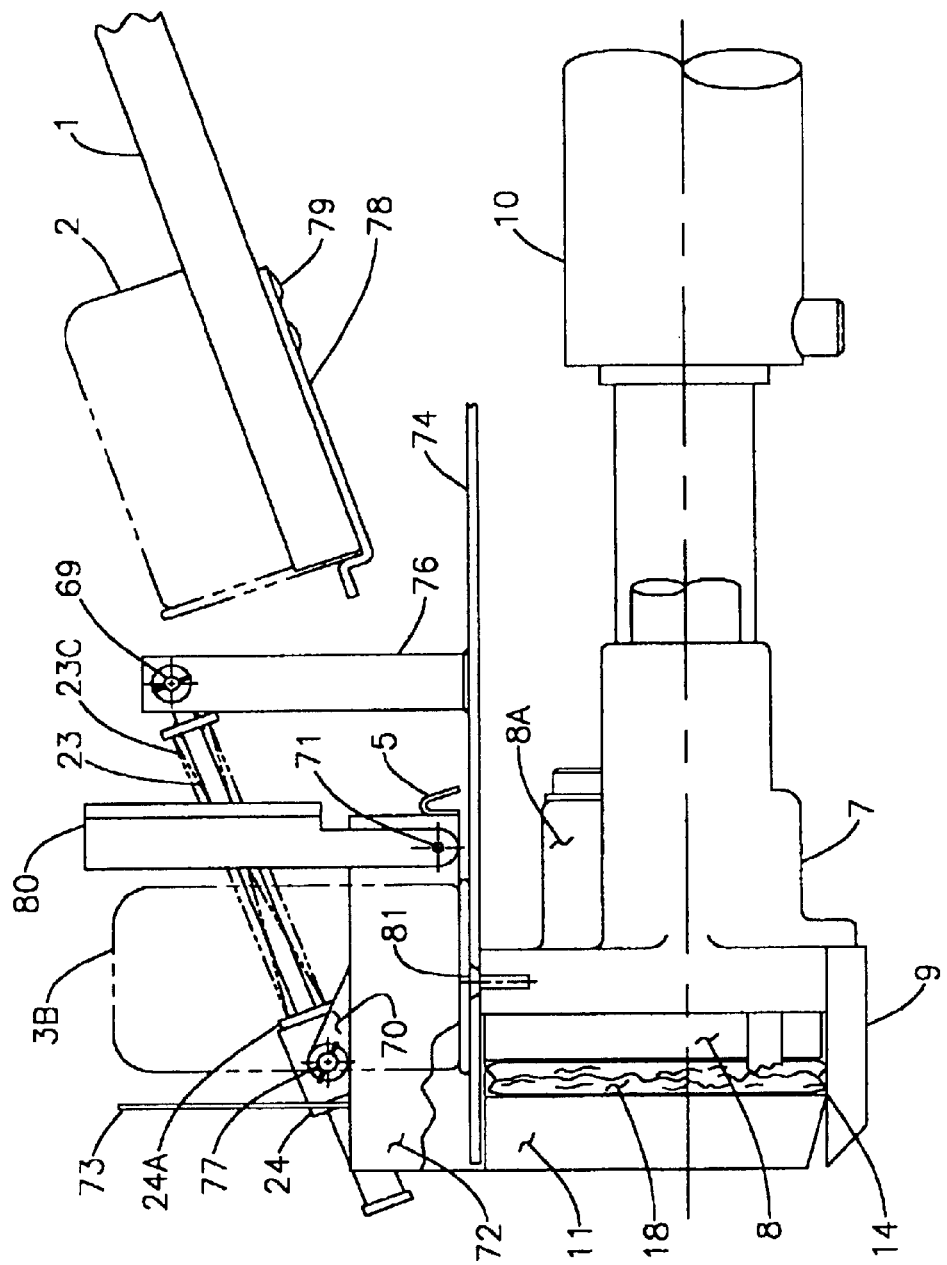
FIG. 14C is a top view of the alternate escapement means.

An alternate system for escaping filters one at a time into the crushing zone is illustrated in FIGS. 14A, 14B and 14C. Feed chute 1 is located centrally to the crushing zone an seen in FIG. 14B. In FIG. 14A, filter 3 is held by tip-up cradle 80 and is retained from sliding further by fixed end plate 5 that is supported by bracket 72 which is fastened to fixed wall 11 with bolts 75. FIG. 14A shows the filer escapement apparatus with driving means 7 fully retracted. When the tip-up cradle is in the retracted or load position as illustrated in FIG. 14A the cradle presses down on leaf spring excluder 78 that is fastened to feed chute 1 by rivets 79. In this position filters can slide down the feed chute into cradle 80 and the lead filter is stopped by end plate 5. Deck plate 74 is fastened to driving means 7 by fasteners 81 and extends toward the crushing zone flush with the face of movable wall 8. Deck plate 74 extends aft away from the crushing zone to providing a mounting for actuator arm 76.

When driving means 7 advances, deck plate 74 also moves along over the top of the crushing zone acting as a shutter like device. As movable wall 8 spring loading collapses crushing canister 18, deck plate 74 covers the crushing zone providing a support for the next filter. When driving means 7 advances, actuator arm 76 starts pushing bar 23 through free travel region 24A. This free travel region delays action of lever arm 70 until deck plate 74 has covered the crushing zone. After bar 23 passes free travel region 24A and has pushed through bearing 24, to where bar collar 25 engages bearing 24, lever arm 70 rotates cradle 80, around pivot point 71. Filter 3 in cradle 80 is raised clear of end plate 5 and when filter 3 is vertical the connector plate on filter 3 slips off of the top or end plate 5, dropping to and resting on deck plate 74 over the crushing zone as illustrated in FIG. 14C by filter 3 in position 3B. Filter 3B now sitting on deck plate 74 falls into the crushing zone when deck plate 74 is retracted along with driving means 7.

When deck plate 74 retracts, space opens between fixed wall 11, stationary stabilizer wall 73 and deck plate 74 and when deck plate 74 is even with movable wall 8, filter 3B, restrained from moving with deck plate 74 by the backside of end plate 5, drops into the crushing zone. FIG. 14C, illustrates, as cradle 80 lifts, leaf spring excluder 78 raises to stop next filter 2 in feed chute 1 from advancing until cradle 80 has returned to its load position, pushing excluder 78 clear of feed chute 1 pathway.

Figure 15:
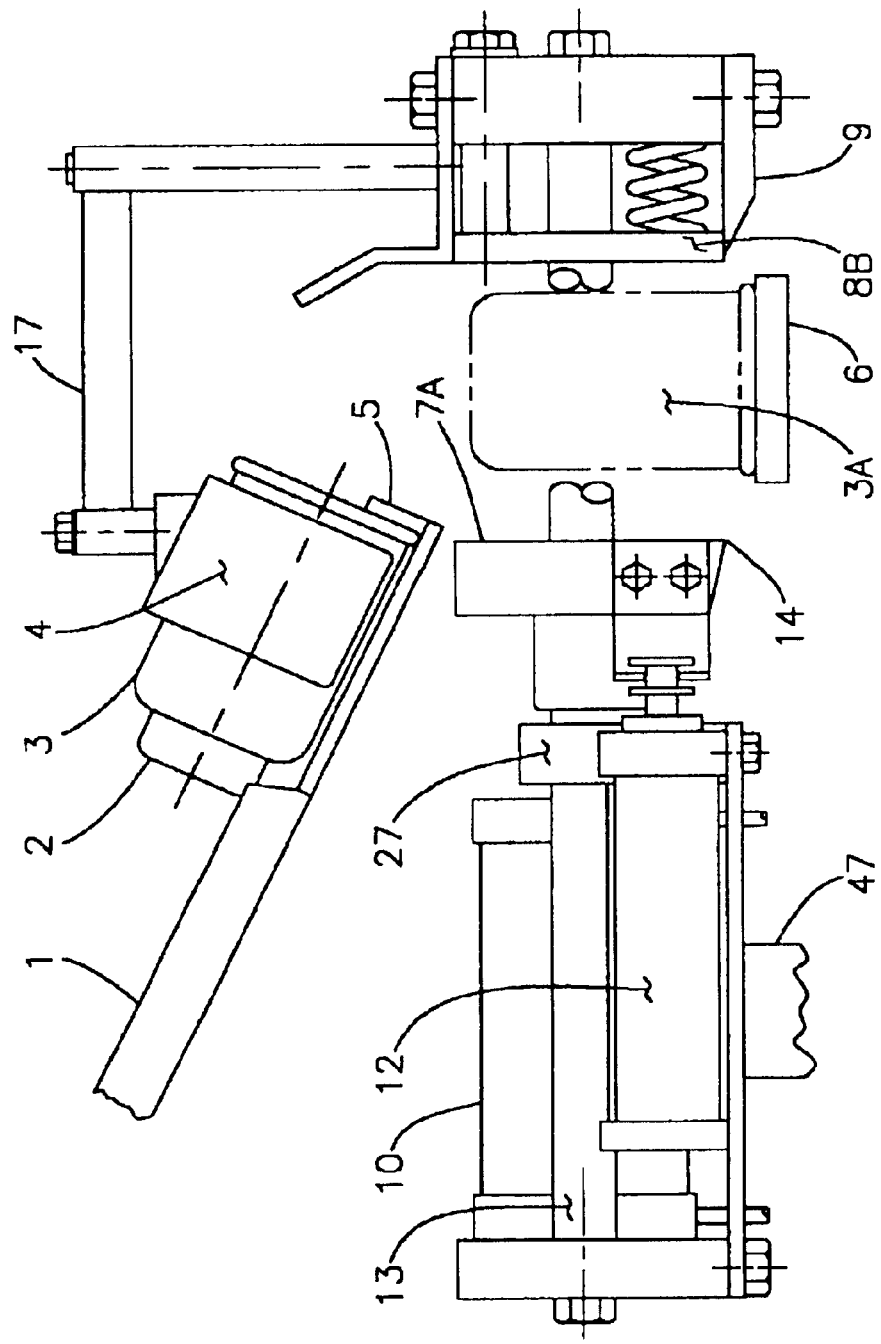
FIG. 15 is a side view of an alternate embodiment of this invention with a moving wall solidly connected to a hydraulic cylinder driving means and an opposite wall with a spring-loaded attachment to a fixed end frame element which has a shear blade attached.

An alternate embodiment of this invention is illustrated in FIG. 15 for automatically escaping a single used oil filter from a multiple filter feed chute into a crushing zone where the filter connector plate is sheared from the filter canister, where the canister and filter element are crushed extracting retained used oil and where the sheared connector plate and crushed canister are selectively discharged from the crushing zone. In automatic operation, filter 3 is escaped from feed chute 1 and during the final increment of retraction of movable wall 7A, filter 3 is driven, by gravity, into a crushing zone intermediate to movable wall 7A and spring-loaded wall 8B attached to fixed frame element 11A, resting on crushing zone floor 6.

With filter 3 in the crushing zone, hydraulic cylinder 10 driving means advances driving movable wall 7A towards filter 3A forcing it against spring-loaded wall 8B collapsing its spring loading exposing shear blade to filter 3A with the cutting blade essentially just above the canister connector plate severing the connector from the canister. On contact of the movable wall 7A with filter 3A, holding it solidly against spring loaded wall 8B, floor 6 retracts downwards driven by cam 28 as can be seen in FIGS. 4 and 5.

Continued advancement of wall 7A, completely collapses wall 8B spring loading, shears the connector plate from filter 3A canister and crushes the canister to a pressure extracting the used oil. Sheared connector plate 38, as illustrated in FIG. 6 falls away, sliding on now sloping floor 6 to location 40. After a dwell period in which movable wall 7A maintains a crushing pressure on the canister for more complete draining, driving means 10 retracts, completely opening floor 6, under the crushing zone by means of cam 28, notch 29 engaging pin 32 on floor 6 and rotating floor 6 on its vertical axis 33 as cam 28 mounted to movable wall retracts. As movable wall 7A continues retracting, wall 8B spring loading extends striping crushed canister 18 off blade 9. Further retraction releases crushed canister 18 where it falls to sloping surface 43 then slides to location 44. The opening of floor 6 and the discharge of crushed canister 18 are as illustrated in FIG. 7. Other functions, not here described, of this alternate embodiment remain essentially as described in the primary embodiment above.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. An apparatus for processing multiple used oil filters for an engine using oil for lubrication by shearing a connector plate of each filter from a canister and then crushing the canister which comprises:

(a) a fixed wall in a frame against which a used oil filter is positioned in a crushing zone with the connector plate below the canister;

(b) a movable wall mounted on the frame which is movable by a driving means to engage the filter in the crushing zone to crush the filter, and which is retracted by the driving means from the crushing zone;

(c) blade means mounted adjacent to the movable wall or adjacent to the fixed wall so as to shear the connector plate from the canister as the movable wall crushes the canister against the fixed wall;

(d) a floor mounted on the frame for the removal of the used oil the sheared connector plate and the crushed canister from the apparatus; and (e) a feed chute with an escapement means for individually and automatically feeding the oil filters to the crushing zone based upon the position of the movable wall wherein a retaining means holds a preceding oil filter of the multiple filters away from the crushing zone until the used oil, the crushed canister and the sheared connection plate have been removed from the crushing zone of the apparatus.

2. The apparatus of claim 1 wherein the blade means is mounted adjacent on the movable wall.

3. The apparatus of claim 1 or 2 wherein the escapement means is activated by a mechanism actuated by movement of the driving means.

4. The apparatus of claim 1 or 2 wherein the escapement means is activated by a transfer mechanism actuated by movement of the movable wall driving means and wherein the escapement means includes a shuttle device for moving the used oil filter to a position adjacent to the crushing zone, wherein when the used oil filter is in the position and is fed by a second driving means into the crushing zone and wherein the transfer mechanism also prevents the used oil filter from being transferred until the preceding connector plate and crushed canister are removed from the crushing zone of the apparatus.

5. The apparatus of claim 1 or 2 wherein the movable wall has a spring-loaded attachment to the driving means which collapses as the wall engages the canister and wherein the blade means is retracted adjacent a side of the moveable wall before the crushing of the canister begins.

6. The apparatus of claim 1 or 2 wherein the floor beneath the filter in the crushing zone is openable and wherein as the shearing of the connector plate and crushing of the filter canister are completed the floor opens upon retraction of the movable wall for removal of the crushed canister and the sheared connector plate.

7. The apparatus of claim 1 or 2 wherein the floor beneath the filter in the crushing zone is openable and wherein after the shearing of the connector plate and crushing of the canister are completed the floor opens upon movement of the movable wall for removal of the crushed canister and the sheared connector plate and wherein the movable wall includes cam means for engaging a pin on the floor for the opening.

8. The apparatus of claim 1 or 2 wherein the floor beneath the filter in the crushing zone is openable and wherein after the shearing of the canister plate and crushing of the canister are completed the floor opens upon retraction of the movable wall for removal of the crushed canister and the sheared connector plate and wherein the driving means includes cam means for engaging a pin on the floor for the opening and wherein the floor opens by movement of the cam means and pin, first to release the canister plate in one direction from the floor when severed, and then to cause the crushed cannister to be removed in another direction from the floor as the movable wall retracts.

9. The apparatus of claim 1 or 2 wherein the escapement means is activated by a mechanism actuated by movement of the driving means, and wherein the mechanism is a bearing connected to the driving means on a slide bar, which bar is connected to parallel levers which move together and shuttle the escapement means between the feed chute and a position adjacent to the crushing zone.

10. The apparatus of claim 1 or 2 wherein a container for the used oil removed from the crushed canister is mounted to the frame and wherein the container is connected to a pump for pumping the used oil to a storage container.

11. The apparatus of claim 1 or 2 controlled by a programmable logic controller.

12. A process for automatically processing used oil filters of the type used in an engine which comprises:
  (a) individually crushing the filters fed by a multiple filter feed means of an apparatus with an escapement for metering one filter at a time into a crushing zone;
  (b) removing a filter connector base plate from a canister of the filter in the crushing zone by a guillotine like shearing action of a blade means which enters the crushing zone during the removing;
  (c) compressing the canister of the filter with an internal filter element to a crushing pressure thereby extracting residual oil from the canister and filter element, wherein the removing and compressing is with a first wall which moves towards a second wall in the zone so that the blade means shears the connector base plate from the filter and so that the walls crush the canister in the crushing zone; and
  (d) discharging the connector plate and crushed canister filter element from the apparatus.

13. The process of claim 12 wherein the waste oil removed to a storage tank by a pump on the apparatus.

14. An apparatus for automatically processing used oil filters of the type used in an engine comprising:
  (a) a multiple filter feed means with an escapement for metering one filter at a time into a zone with a blade means, which enters the zone during the removal and removes a connector base plate from a canister of the filter by a guillotine like shearing action of the blade means, wherein a first wall is moved towards a second wall in the zone so that the blade means shears the connector base plate from the filter and the walls crush the canister in the zone, thereby extracting residual oil from the filter element, door means for selectively discharging the crushed canister, filter element and the connector plate from the apparatus.

15. The apparatus of claim 4 wherein the feed means uses gravity for final feeding of the filter into the crushing zone.

16. An apparatus for processing multiple used oil filters for an engine using oil for lubrication by shearing a connector plate of each filter from a canister and then crushing the canister which comprises:
  (a) a fixed wall in a frame against which a used oil filter is positioned in a crushing zone with the filter axis parallel to the fixed wall;
  (b) a movable wall mounted on guideways of the frame which is movable by a driving means to engage the filter in the crushing zone to crush the filter, and which is retracted by the driving means from the crushing zone;
  (c) blade means mounted on the driving means adjacent to the movable wall and adjacent to the fixed wall so as to shear the connector plate from the canister as the movable wall crushes the canister against the fixed wall;
  (d) a retractable floor in said crushing zone mounted on the frame which retracts for the removal of the used oil, the sheared connector plate and the crushed canister from the apparatus; and
  (e) a feed chute with an escapement means for individually and automatically feeding the oil filters to the crushing zone based upon the position of the movable wall, wherein a retaining means holds a preceding oil filter of the multiple filters away from the crushing zone until the used oil, the crushed canister and the sheared connector plate have been removed from the crushing zone.

17. The apparatus of claim 16 wherein the blade means is mounted on the driving means adjacent to an underside of the movable wall.

18. The apparatus of claim 16 or 17 wherein the escapement means is activated by a mechanism actuated by movement of the movable wall driving means.

19. The apparatus of claim 16 or 17 wherein the escapement means is activated by a transfer mechanism actuated by movement of the movable wall driving means and wherein the escapement means includes a shuttle device for moving the used oil filter to a position adjacent to the crushing zone, wherein when the used oil filter is in the position and is fed by a secondary means into the crushing zone and wherein the transfer mechanism also prevents the used oil filter from being fed until the preceding connector plate and crushed canister are removed from the crushing zone.

20. The apparatus of claim 16 or 17 wherein the movable wall has a spring-loaded attachment to the driving means which collapses as the movable wall engages the canister and wherein the blade means is retracted adjacent a side of the movable wall before the crushing of the canister begins.

21. The apparatus of claim 19 wherein the secondary means uses gravity for final feeding of filter into the crushing zone.

22. The apparatus of claim 16 or 17 wherein the floor beneath the filter in the crushing zone is retractable and wherein as the shearing of the connector and crushing are in process the floor retracts for removal of the sheared connector plate and the crushed canister.

23. The apparatus of claim 16 or 17 wherein the floor beneath the filter in the crushing zone is retractable and wherein after the shearing of the connector plate and crushing of the canister are completed the floor opens upon movement of the movable wall for removal of the crushed canister and the sheared connector plate and wherein the movable wall includes cam means for engaging a pin on the floor for the opening.

24. The apparatus of claim 16 or 17 wherein the floor beneath the filter in the crushing zone is retractable and wherein during the shearing of the connector plate the floor retracts to a first retracted position and when crushing of the canister is completed and retracts to a second retracted position upon retraction of the movable wall for removal of the crushed canister and the sheared connector plate and wherein the driving means includes cam means for engaging a pin on the floor for the opening and wherein the floor opens by crushing movement of the movable wall cam means and pin, first to release the connector plate in one direction from the floor when severed, and then to cause the crushed canister to be removed in another direction from the floor as the movable wall retracts.

25. The apparatus of claim 16 or 17 wherein the escapement means is activated by a mechanism actuated by movement of the driving means, and wherein the mechanism is a bearing connected to the driving means on a slide bar, which bar is connected to parallel levers which move together and shuttle the escapement means between the feed chute and a position adjacent to the crushing zone.

26. The apparatus of claim 16 or 17 wherein a container for the used oil removed from the crushed canister is mounted to the frame and wherein the container is connected to a pump for pumping the used oil to a storage container.

27. The apparatus of claim 1 or 2 controlled by a programmable logic controller.

28. The apparatus of claim 16 wherein one of the walls is concave.

* * * * *